US012711808B2

(12) United States Patent
Ortega Pena et al.

(10) Patent No.: US 12,711,808 B2
(45) Date of Patent: Aug. 18, 2026

(54) ROBUST AND LONG-RANGE MULTI-PERSON IDENTIFICATION USING MULTI-TASK LEARNING

(71) Applicant: Samsung Electronics Co., Ltd., Suwon-si (KR)

(72) Inventors: Andres Leonardo de Jesus Ortega Pena, San Jose, CA (US); Ashwin Chandra, Santa Clara, CA (US); Suk-Un Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 270 days.

(21) Appl. No.: 18/406,963

(22) Filed: Jan. 8, 2024

(65) Prior Publication Data

US 2025/0225817 A1 Jul. 10, 2025

(51) Int. Cl.
*G06V 10/00* (2022.01)
*G06T 7/73* (2017.01)
(Continued)

(52) U.S. Cl.
CPC ................ *G06V 40/40* (2022.01); *G06T 7/74* (2017.01); *G06V 10/7715* (2022.01);
(Continued)

(58) Field of Classification Search
CPC .... G06V 10/82; G06V 10/761; G06V 10/762; G06V 10/764; G06V 10/765;
(Continued)

(56) References Cited

U.S. PATENT DOCUMENTS 7,912,246 B1 * 3/2011 Moon ..................... G06F 18/24 382/118
9,014,465 B2 * 4/2015 Metaxas ............. G06V 40/176 382/159

(Continued)

FOREIGN PATENT DOCUMENTS

AU 2021104662 A4 10/2021
WO 2020236651 A1 11/2020

OTHER PUBLICATIONS

Ya-Li et al., "CN 103876756 A, Lower Limb Assisting Exoskeleton Robot Gait Pattern Recognition Method AndSystem"; date published Jun. 25, 2014.*

(Continued)

*Primary Examiner* — Amir Alavi

(57) ABSTRACT

A method includes obtaining image frames capturing one or more people in at least one scene and identifying features of the image frames. The method also includes providing the identified features to a trained spatiotemporal transformer machine learning model configured to generate a set of features for each of the one or more people. The set of features for each person includes facial features of the person and pose features of the person over time. The method further includes performing face identification using the facial features to generate one or more first embeddings representing at least one face of at least one person and performing gait identification using the pose features to generate one or more second embeddings representing at least one gait of at least one person. In addition, the method includes identifying at least one of the one or more people based on the first and second embeddings.

20 Claims, 9 Drawing Sheets

(51) Int. Cl.

| | |
|---|---|
| ***G06V 10/77*** | (2022.01) |
| ***G06V 20/70*** | (2022.01) |
| ***G06V 40/16*** | (2022.01) |
| ***G06V 40/20*** | (2022.01) |
| ***G06V 40/40*** | (2022.01) |
| ***G10L 17/02*** | (2013.01) |
| ***G10L 17/14*** | (2013.01) |

(52) U.S. Cl.

CPC ............ *G06V 20/70* (2022.01); *G06V 40/168* (2022.01); *G06V 40/172* (2022.01); *G06V 40/25* (2022.01); *G06V 40/28* (2022.01); *G10L 17/02* (2013.01); *G10L 17/14* (2013.01); *G06T 2207/20081* (2013.01); *G06T 2207/20084* (2013.01); *G06T 2207/30201* (2013.01)

(58) Field of Classification Search

CPC .... G06V 10/7715; G06V 10/85; G06V 40/40; G06V 40/172; G06V 40/20; G06V 40/25; G06V 40/28; G06V 20/70; G06T 7/74; G06T 2207/20081; G06T 2207/20084; G10L 15/25; G10L 17/02; G10L 17/14; G10L 17/30201

See application file for complete search history.

(56) References Cited

U.S. PATENT DOCUMENTS

| | | | | |
|---|---|---|---|---|
| 10,170,135 | B1 | 1/2019 | Pearce et al. | |
| 10,489,690 | B2 * | 11/2019 | Jin | G06V 40/168 |
| 11,069,150 | B2 | 7/2021 | Sminchisescu et al. | |
| 11,080,316 | B1 * | 8/2021 | Das | G06F 16/434 |
| 11,210,380 | B2 | 12/2021 | Hoyos et al. | |
| 11,321,868 | B1 | 5/2022 | Akbas et al. | |
| 11,373,352 | B1 * | 6/2022 | Gafni | G06T 11/60 |
| 11,431,660 | B1 | 8/2022 | Leeds et al. | |
| 11,527,078 | B2 * | 12/2022 | Littman | G06T 7/90 |
| 11,734,907 | B2 * | 8/2023 | Pradeep | G06V 20/58 382/103 |
| 11,756,334 | B2 * | 9/2023 | Liu | G06F 18/214 382/156 |
| 11,790,682 | B2 * | 10/2023 | Ghafoor | G06V 40/103 382/156 |
| 12,314,665 | B2 * | 5/2025 | Agarwal | G06V 30/414 |
| 2023/0134967 | A1 | 5/2023 | Francesca et al. | |
| 2023/0259595 | A1 | 8/2023 | Huang et al. | |
| 2023/0273986 | A1 | 8/2023 | Storm et al. | |
| 2025/0118103 | A1 * | 4/2025 | Chandran | G06T 3/02 |
| 2025/0225817 | A1 * | 7/2025 | Ortega Pena | G10L 17/14 |

OTHER PUBLICATIONS

Chen et al., "CN 115482595 A, Method For Detecting And Identifying Special Human Visual Falsification BasedOn Semantic Segmentation, Involves Synthesizing Fake Video Detection Mode OfEach Attribute Classification Weight Output Result" date published Dec. 16, 2022.*

Feng, Lian-sheng, "CN 202548924 U,Novel Cardpunch ", date published Nov. 21, 2012.*

Pala et al., "Person Re-Identification from Depth Cameras using Skeleton and 3D Face Data," Eurographics Workshop on 3D Object Retrieval, 2018, 7 pages.

Noh et al., "Smart Home with Biometric System Recognition," Journal of Physics: Conference Series, 2020, 10 pages.

Carion et al., "End-to-End Object Detection with Transformers," arXiv:2005.12872v3 [cs.CV], May 2020, 26 pages.

* cited by examiner 100
140
147
145
143
141
Application
Application Programming Interface (API)
Middleware
Kernel
104
Electronic Device
Server
106
162
Network
101
Electronic Device
130
Memory
120
Processor
180
Sensor
110
Bus
170
Communication Interface
164
Electronic Device
102
160
Display
150
Input/Output Interface

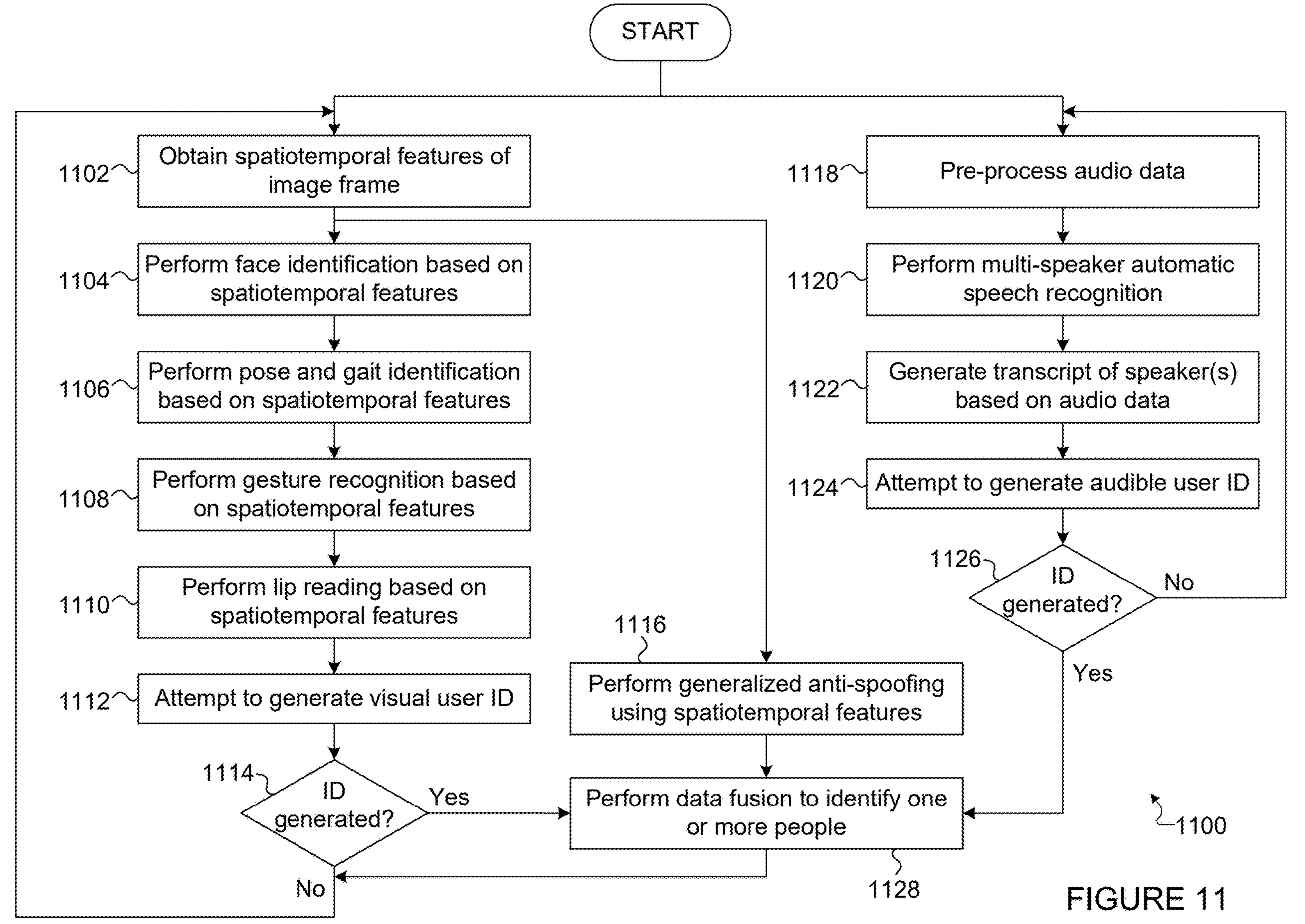
START
1102
Obtain spatiotemporal features of image frame
1104
Perform face identification based on spatiotemporal features
1106
Perform pose and gait identification based on spatiotemporal features
1108
Perform gesture recognition based on spatiotemporal features
1110
Perform lip reading based on spatiotemporal features
1112
Attempt to generate visual user ID
1114
ID generated?
Yes
No
1118
Pre-process audio data
1120
Perform multi-speaker automatic speech recognition
1122
Generate transcript of speaker(s) based on audio data
1124
Attempt to generate audible user ID
1126
ID generated?
No
Yes
1116
Perform generalized anti-spoofing using spatiotemporal features
Perform data fusion to identify one or more people
1128
1100
FIGURE 11

ROBUST AND LONG-RANGE MULTI-PERSON IDENTIFICATION USING MULTI-TASK LEARNING

TECHNICAL FIELD

This disclosure relates generally to identification systems. More specifically, this disclosure relates to robust and long-range multi-person identification using multi-task learning.

BACKGROUND

Smart home technology is advancing at a rapid pace, allowing users to interact with virtual assistants in their homes to initiate or perform a number of different tasks. Users can interact with smart home devices in various ways, including "contact-free" approaches in which the users speak to their virtual assistants in their homes and interact with the virtual assistants using verbal communications. As an example, users may speak queries to their virtual assistants and receive audible answers in response to the queries from the virtual assistants. As another example, users may provide verbal commands to their virtual assistants, and the virtual assistants may process the verbal commands and initiate tasks in response to the users' commands.

SUMMARY

This disclosure relates to robust and long-range multi-person identification using multi-task learning.

In a first embodiment, a method includes obtaining, using at least one processing device of an electronic device, image frames capturing one or more people in at least one scene. The method also includes identifying, using the at least one processing device, features of the image frames. The method further includes providing, using the at least one processing device, the identified features to a trained spatiotemporal transformer machine learning model. The trained spatiotemporal transformer machine learning model is configured to generate a set of features for each of the one or more people. The set of features for each person includes facial features of the person and pose features of the person over time. The method also includes performing, using the at least one processing device, face identification using the facial features in each set of features to generate one or more first embeddings representing at least one face of at least one of the one or more people. The method further includes performing, using the at least one processing device, gait identification using the pose features in each set of features to generate one or more second embeddings representing at least one gait of at least one of the one or more people. In addition, the method includes identifying, using the at least one processing device, at least one of the one or more people based on the first and second embeddings.

In a second embodiment, an electronic device includes at least one processing device configured to obtain image frames capturing one or more people in at least one scene and identify features of the image frames. The at least one processing device is also configured to provide the identified features to a trained spatiotemporal transformer machine learning model. The trained spatiotemporal transformer machine learning model is configured to generate a set of features for each of the one or more people. The set of features for each person includes facial features of the person and pose features of the person over time. The at least one processing device is further configured to perform face identification using the facial features in each set of features to generate one or more first embeddings representing at least one face of at least one of the one or more people. The at least one processing device is also configured to perform gait identification using the pose features in each set of features to generate one or more second embeddings representing at least one gait of at least one of the one or more people. In addition, the at least one processing device is configured to identify at least one of the one or more people based on the first and second embeddings.

In a third embodiment, a non-transitory machine readable medium contains instructions that when executed cause at least one processor of an electronic device to obtain image frames capturing one or more people in at least one scene and identify features of the image frames. The non-transitory machine readable medium also contains instructions that when executed cause the at least one processor to provide the identified features to a trained spatiotemporal transformer machine learning model. The trained spatiotemporal transformer machine learning model is configured to generate a set of features for each of the one or more people. The set of features for each person includes facial features of the person and pose features of the person over time. The non-transitory machine readable medium further contains instructions that when executed cause the at least one processor to perform face identification using the facial features in each set of features to generate one or more first embeddings representing at least one face of at least one of the one or more people. The non-transitory machine readable medium also contains instructions that when executed cause the at least one processor to perform gait identification using the pose features in each set of features to generate one or more second embeddings representing at least one gait of at least one of the one or more people. In addition, the non-transitory machine readable medium contains instructions that when executed cause the at least one processor to identify at least one of the one or more people based on the first and second embeddings.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which:

FIG. 11 illustrates an example method for processing spatiotemporal features during multi-person identification in accordance with this disclosure.

DETAILED DESCRIPTION

Figure 1:
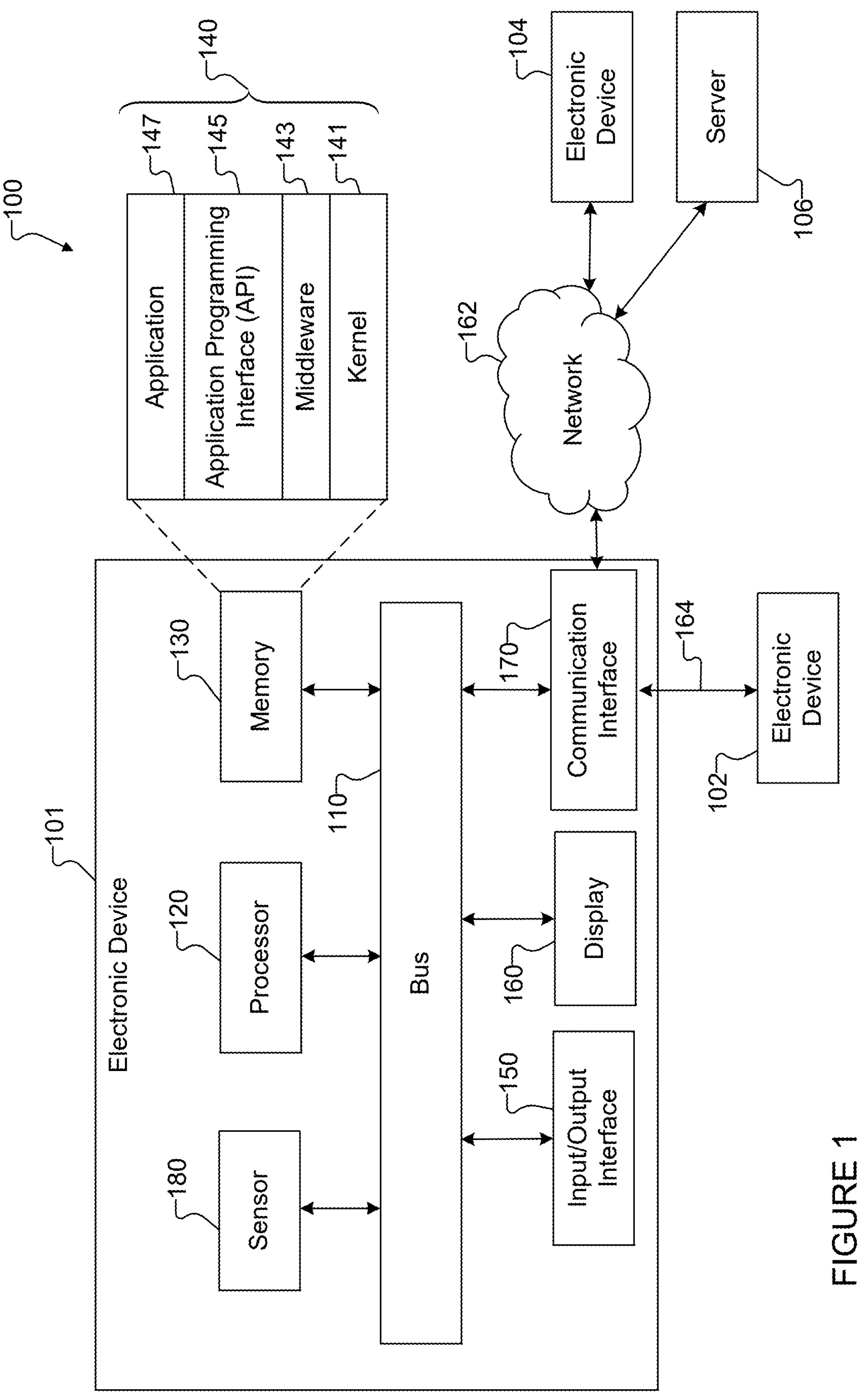
FIG. 1 illustrates an example network configuration including an electronic device in accordance with this disclosure.

FIGS. 1 through 11, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, smart home technology is advancing at a rapid pace, allowing users to interact with virtual assistants in their homes to initiate or perform a number of different tasks. Users can interact with smart home devices in various ways, including "contact-free" approaches in which the users speak to their virtual assistants in their homes and interact with the virtual assistants using verbal communications. As an example, users may speak queries to their virtual assistants and receive audible answers in response to the queries from the virtual assistants. As another example, users may provide verbal commands to their virtual assistants, and the virtual assistants may process the verbal commands and initiate tasks in response to the users' commands.

Combined with the rise of conversational artificial intelligence (AI), smart home technologies have new applicability to a number of new and useful applications. However, accurate identification of users may be needed in various circumstances in order to provide secure, automatic, and consistent experiences. Many smart home interactions can rely on different degrees of identification, authentication, or access control, and specialized devices are often needed in order to perform these functions. Commodity sensor hardware (such as microphone arrays and video cameras) available in everyday smart devices (such as smart televisions) may be good candidates for user identification tasks or other tasks since they are ubiquitous and cost-effective. Ideally, devices such as this may perform effective user identification while removing friction during use, working silently in the background, and prioritizing privacy by keeping user data secure.

Unfortunately, user authentication, access control, and other identity-aware tasks in homes equipped with smart home technologies present a set of distinctive challenges. For example, smart home technologies are not always well-designed to accommodate multiple users effectively, which can lead to a lack of basic access control or other features that would make the overall system more accessible and user-friendly for everyone. Since many households have multiple occupants who may be present during certain tasks, it may be useful or desirable to identify principal users (master account holders) or other users needed to complete tasks successfully. Also, face recognition technology has become increasingly popular in various interactive applications, and the convenience, accuracy, and cost-effectiveness of face recognition technology often make it the preferred choice for biometric identification. However, face recognition technology has various limitations, such as when its accuracy decreases with distance and when it requires proper face alignment and framing for identification. Face recognition systems are also not foolproof and can be vulnerable to presentation attacks, such as spoofing attacks that may range from printing and replaying actions to the use of makeup and three-dimensional masks. In addition, behavioral biometrics (meaning biometrics in the time domain) can rely on unique characteristics of every individual and can be highly accurate and less susceptible to spoofing attacks. However, creating a robust machine learning model for behavioral biometrics is challenging and sometimes impractical since it can require a considerable amount of accurately-labeled training data, which may be difficult, expensive, and time-consuming to obtain.

This disclosure provides various techniques for robust and long-range multi-person identification using multi-task learning. As described in more detail below, image frames capturing different people in at least one scene may be obtained. The image frames may be captured using any suitable device(s), such as one or more home automation devices like a smart television. Features of the image frames may be identified, such as by using a convolutional neural network or other trained machine learning model. The identified features may be provided to a trained spatiotemporal transformer machine learning model, which can be configured to generate a set of features for each person captured in the image frames. The set of features for each person includes facial features of the person and pose features of the person over time, and one or more additional features of each person may also be generated depending on the implementation. Multi-face identification may be performed using the facial features in each set of features to generate first embeddings representing faces of at least some of the people, and gait identification may be performed using the pose features in each set of features to generate second embeddings representing gaits of at least some of the people. Additional embeddings associated with at least some of the people may also be identified, such as lip reading embeddings or other embeddings related to other characteristics of at least some of the people. One or more of the people may be identified based on the embeddings.

The identification of the one or more people may be used in any suitable manner. For example, one or more actions that are requested by the one or more people may be identified and performed, and the one or more actions may be identified based on input from the one or more identified people. In some cases, landmarks associated with at least one person's hands may be included in the pose features of the at least one person and may be used to identify one or more gestures made by the at least one person, and the input from the one or more identified people may include the one or more gestures. Various example use cases for these types of functionalities are provided below.

In this way, the described techniques can support an identity-aware system that silently identifies and tracks multiple people in one or more video streams or other input images. The people being tracked can be anonymous (meaning people who are not currently recognized by the system) or preregistered (meaning people who have been previously identified by the system and whose identifications have not been removed). The system can identify various people even at longer distances, such as by fusing the results from face identification and gait identification (possibly along with other user-related data). In some cases, successful identification can occur even at larger distances (such as up to five meters or more) and in poor lighting conditions. Further, user information and access control can be secured using generalized anti-spoofing, which can be used during user identification and data fusion to validate the authenticity of user interactions. In addition, it is possible to combine these functionalities with audio processing functionalities to further increase the accuracy and effectiveness of the identity-aware system.

As a particular example of certain benefits that might be obtained, interacting with a smart home virtual assistant can often be done through physical, verbal, or visual cues. An intelligent assistant may use any of these to determine a user's intent or to carry out a task. Among other reasons, this has been made possible due to improvements in natural language understanding and the abilities of smart home assistants to have extended conversations with users, such as when handling daily routines. However, smart home systems have a potential power imbalance between those users who set up and manage the systems and those users who use the systems more passively. To alleviate this accessibility problem and improve multi-user tracking abilities, the described techniques incorporate the use of the spatiotemporal transformer model, which can be trained to provide robust pose-based inferencing and tracking that allow both preregistered and anonymous users to interact visually with the smart home systems. The inclusion of audio processing can further improve the ability of the smart home systems to identify and interact with users. The ability to consolidate and analyze all information associated with each person enables more effective determinations of whether each person is registered and whether gestures are being provided as input to the smart home systems.

Note that while some of the embodiments discussed below are described in the context of use in specific types of consumer electronic devices (such as televisions), this is merely one example. It will be understood that the principles of this disclosure may be implemented in any number of other suitable contexts and may use any suitable device or devices. Also note that while various embodiments discussed below are described based on the assumption that a single device receives and processes image frames in order to identify users and perform functions for the users, this is also merely one example. It will be understood that the principles of this disclosure may be implemented using any number of devices, including one device that captures image frames and another device that processes the image frames or one device that identifies users and another device that performs one or more actions requested by the users. In general, this disclosure is not limited to use with any specific type(s) of device(s). In addition, while some of the embodiments discussed below may be described in the context of use within a smart home, this is for illustration and explanation only, and the described techniques may be used in any other suitable environments.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), a graphics processor unit (GPU), or a neural processing unit (NPU). The processor 120 is able to perform control on at least one of the other components of the electronic device 101 and/or perform an operation or data processing relating to communication or other functions. As described below, the processor 120 may be used to perform robust and long-range multi-person identification using multi-task learning.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for performing robust and long-range multi-person identification using multi-task learning. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to perform robust and long-range multi-person identification using multi-task learning.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
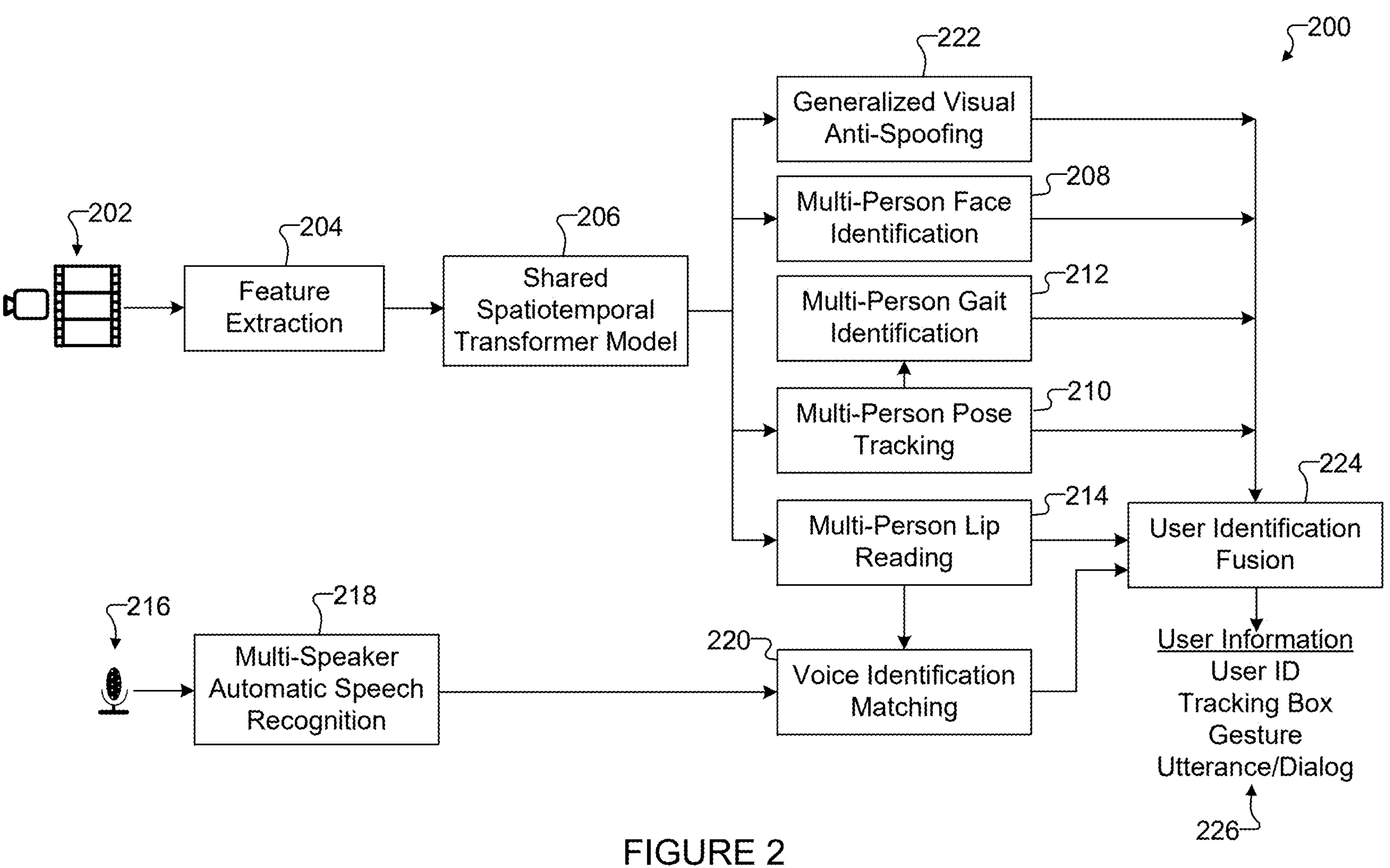
FIG. 2 illustrates an example architecture for robust and long-range multi-person identification using multi-task learning in accordance with this disclosure.

FIG. 2 illustrates an example architecture 200 for robust and long-range multi-person identification using multi-task learning in accordance with this disclosure. For ease of explanation, the architecture 200 shown in FIG. 2 is described as being implemented on or supported by the electronic device 101 in the network configuration 100 of FIG. 1. However, the architecture 200 shown in FIG. 2 could be used with any other suitable device(s) and in any other suitable system(s), such as when the architecture 200 is implemented on or supported by the server 106.

As shown in FIG. 2, the architecture 200 generally operates to receive and process image frames 202. Each image frame 202 represents an image that captures a scene, and one or more people within the scene may be captured in at least some of the image frame 202. Each image frame 202 may represent an image in a sequence of image frames (such as a video sequence) to be processed in order to identify at least one of the one or more people. As described below, the architecture 200 has the ability to process image frames 202 in order to identify multiple people captured in the image frames 202. The image frames 202 may be obtained from any suitable source(s), such as from one or more cameras of at least one smart home device. The architecture 200 may receive and process any suitable number of image frames 202. In some embodiments, for example, the image frames 202 may be stored in a ring buffer or other storage until a specified number N of image frames 202 have been obtained. In some cases, N may be three, four, five, six, or other suitable integer value. Once sufficient image frames 202 are available, the image frames 202 may be processed (possibly along with other data) to identify one or more people captured in the image frames 202.

Spatiotemporal features are extracted from the image frames 202 using a feature extraction function 204 and a shared spatiotemporal transformer model 206. The feature extraction function 204 processes the image frames 202 and identifies relevant features of the image frames 202. For example, the feature extraction function 204 may identify features of the image frames 202 that are relevant to the task of user identification. The feature extraction function 204 can use any suitable technique to perform feature extraction, such as positionally encoding and projecting the image frames 202 to generate tokens representing the contents of the image frames 202. In some cases, this can involve downscaling the image dimensions when generating the tokens. The feature extraction function 204 may also use any suitable machine learning or other logic to perform feature identification and extraction. In some embodiments, the feature extraction function 204 may be implemented using a convolutional neural network (such as MobileNet), a vision transformer (ViT), an optical flow model, or other trained machine learning model.

Figure 3:
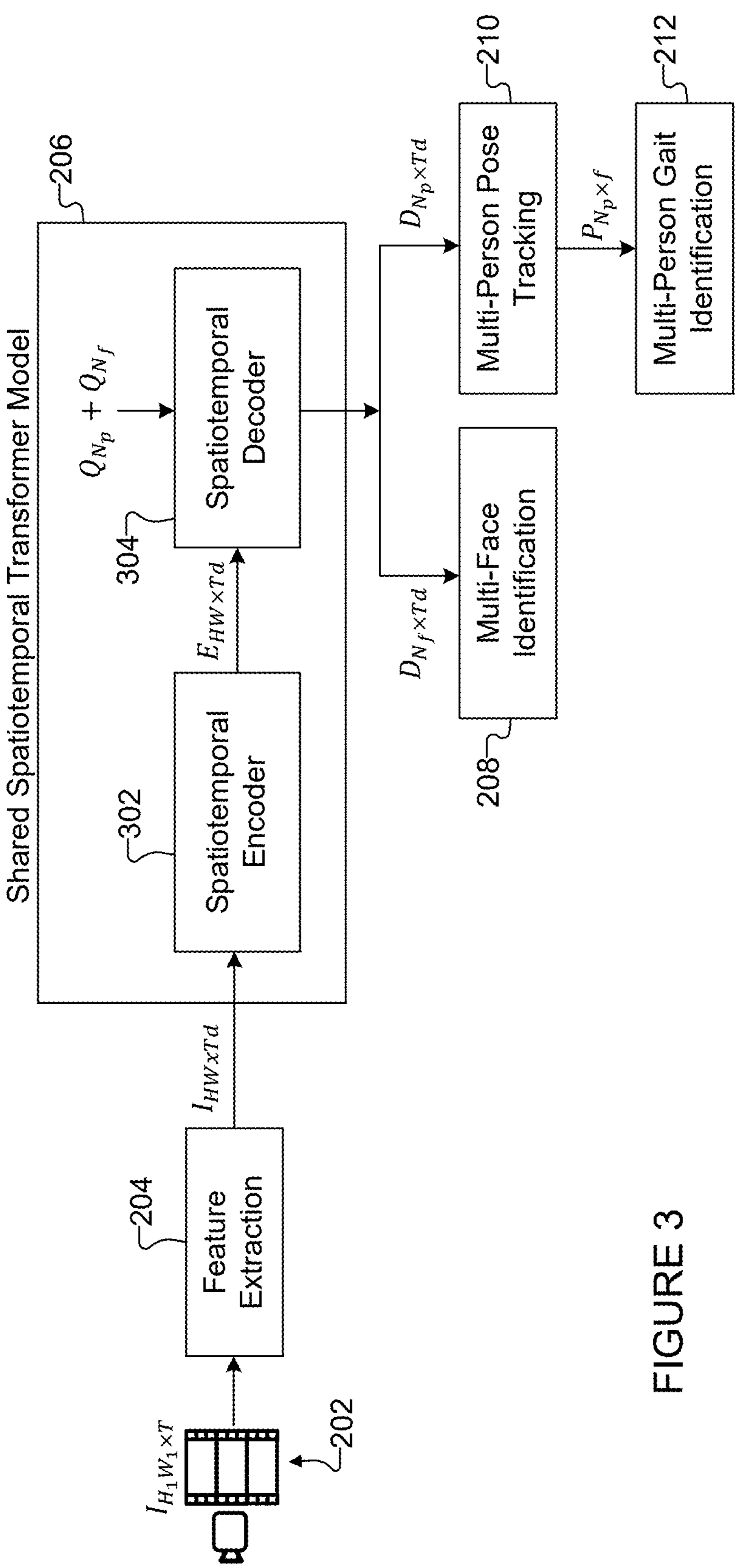
FIG. 3 illustrates an example shared spatiotemporal transformer model in the architecture of FIG. 2 in accordance with this disclosure.

The identified features from the feature extraction function 204 are provided to the shared spatiotemporal transformer model 206, which represents a transformer-based machine learning model trained to process the identified features of the image frames 202 and generate spatiotemporal features associated with the image frames 202. For example, the shared spatiotemporal transformer model 206 can generate a set of spatiotemporal features for each person captured in the image frames 202. The set of features for each person captures that person's representation in the image frames 202 over time. Each set of features can capture any suitable characteristics of the associated person, such as facial features of the person and pose features of the person over time. As particular examples, each set of features may capture the associated person's entire body pose (such as body, hands, and face dense landmarks) and facial features. The shared spatiotemporal transformer model 206 is effectively aggregating multi-frame features generated using the image frames 202 into temporal and spatial characteristics associated with the people in the image frames 202. The shared spatiotemporal transformer model 206 may use any suitable machine learning or other logic to generate spatiotemporal features associated with people in image frames 202. For instance, the shared spatiotemporal transformer model 206 may include an encoder that provides self-attention and a decoder that provides query-to-spatial multi-head sparse attention. One example of the shared spatiotemporal transformer model 206 is shown in FIG. 3, which is described below.

Figure 6:
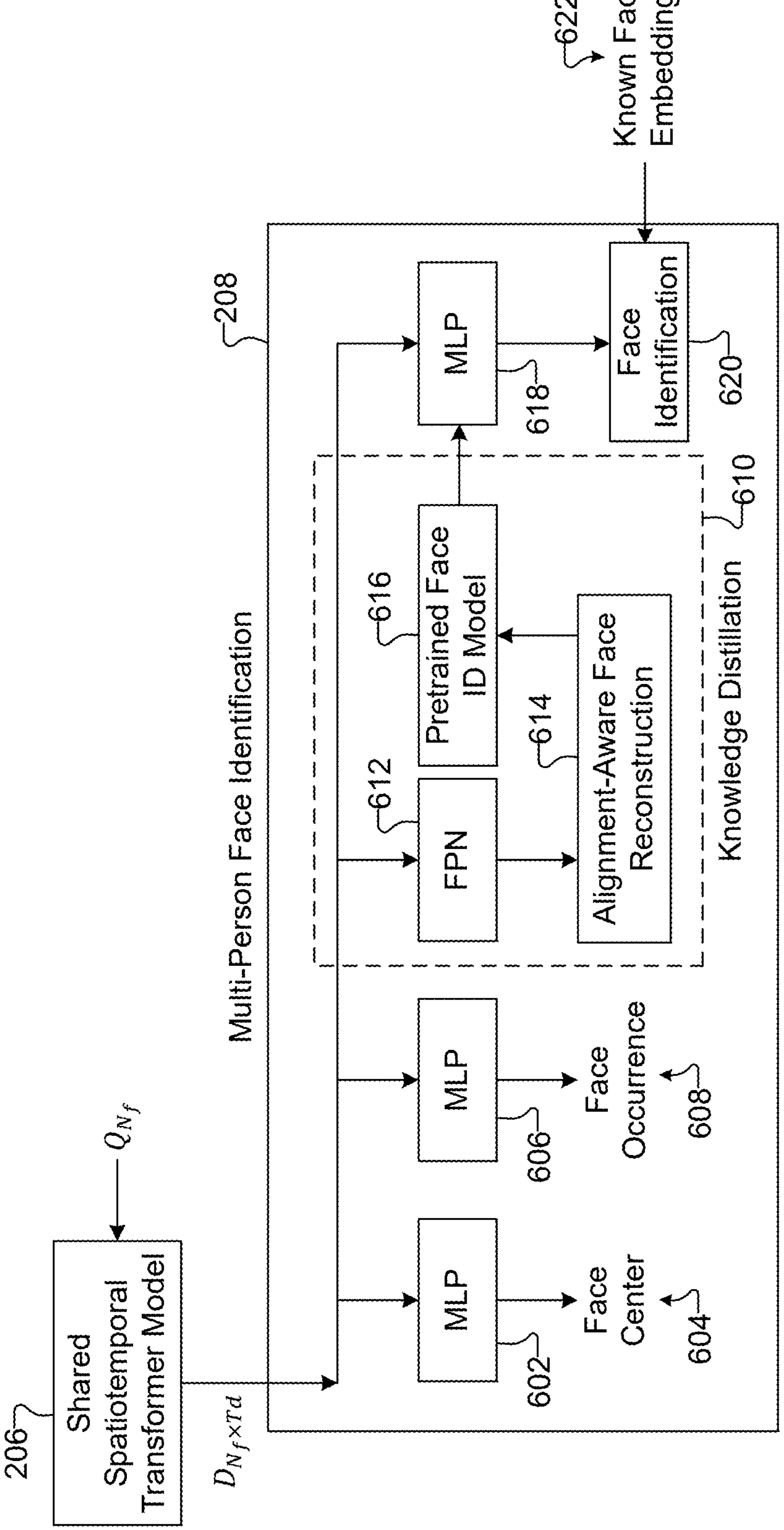
FIG. 6 illustrates an example multi-person face identification function in the architecture of FIG. 2 in accordance with this disclosure.

The spatiotemporal features generated by the shared spatiotemporal transformer model 206 are processed using various functions shown in FIG. 2 to identify various characteristics of one or more people captured in the image frames 202. As shown in FIG. 2, a multi-person face identification function 208 can process at least some of the spatiotemporal features to generate embeddings that represent faces of at least some of the people in the image frames 202. For example, the multi-person face identification function 208 can process facial features in each set of features produced by the shared spatiotemporal transformer model 206 to generate the embeddings representing the faces of at least some of the people in the image frames 202. In some cases, the multi-person face identification function 208 may generate an embedding vector for each of one or more people captured in the image frames 202. In some cases, the multi-person face identification function 208 can detect and identify multiple faces simultaneously, and the multi-person face identification function 208 can handle obstacles and face-on-face occlusions when multiple individuals are present (which is due to the attention mechanisms supported by the shared spatiotemporal transformer model 206). The multi-person face identification function 208 may use any suitable machine learning or other logic to generate embeddings associated with people's facial features. One example of the multi-person face identification function 208 is shown in FIG. 6, which is described below.

Figures 4, 5:
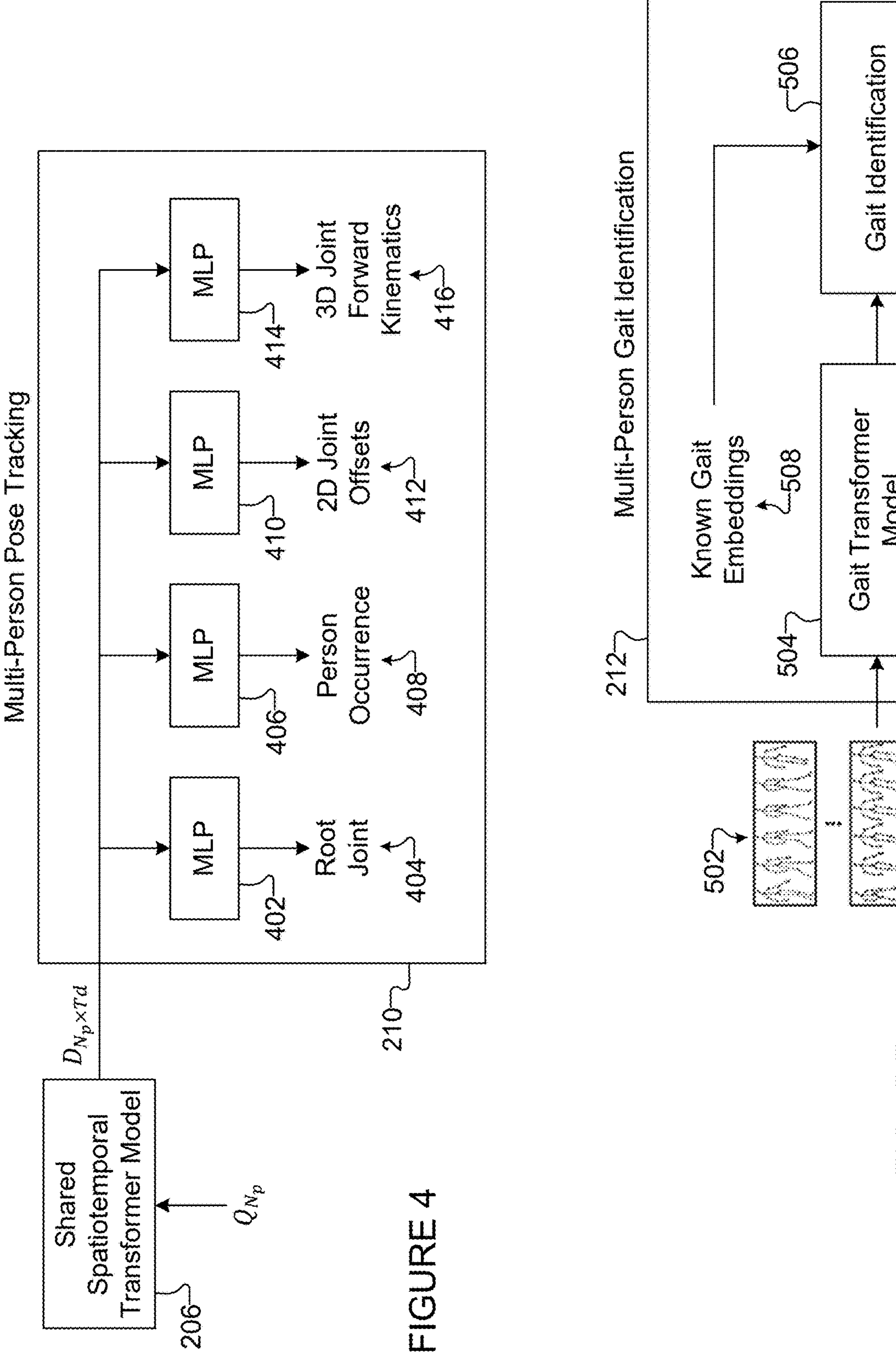
FIG. 4 illustrates an example multi-person pose tracking function in the architecture of FIG. 2 in accordance with this disclosure.
FIG. 5 illustrates an example multi-person gait identification function in the architecture of FIG. 2 in accordance with this disclosure.

A multi-person pose tracking function 210 can process at least some of the spatiotemporal features to generate embeddings that represent poses of at least some of the people in the image frames 202 over time. For example, the multi-person pose tracking function 210 can process pose features in each set of features produced by the shared spatiotemporal transformer model 206 to generate embeddings representing a spatiotemporal pose estimation of each of at least one person captured in the image frames 202 over time. The spatiotemporal pose estimation may identify various information about a person, such as a full-body pose of the person (including his or her hands), a bounding box around the person, a segmentation of the person's body into different parts (such as head, torso, arms, hands, legs, and feet), and a tracking identifier associated with the person. In some cases, the multi-person pose tracking function 210 may generate an embedding vector for each of one or more people captured in the image frames 202. The multi-person pose tracking function 210 may use any suitable machine learning or other logic to generate embeddings associated with people's pose features. One example of the multi-person pose tracking function 210 is shown in FIG. 4, which is described below.

A multi-person gait identification function 212 uses the outputs of the multi-person pose tracking function 210 to identify the gait of each of one or more people captured in the image frames 202. A person's gait refers to the pattern of movement of the person and the person's limbs (such as his or her arms and legs) during motion of the person over a solid surface. The multi-person gait identification function 212 can use the information generated by the multi-person pose tracking function 210 related to each person's pose when performing gait identification. For example, the multi-person gait identification function 212 may use three-dimensional (3D) skeletal estimation (optionally aided by body part segmentation) along with the estimated poses of the people to produce embeddings for gait identification. The gait embeddings can also facilitate reidentification of people as the people move between different views or different scenes. In some cases, the multi-person gait identification function 212 may generate an embedding vector for each of one or more people captured in the image frames 202. The multi-person gait identification function 212 may use any suitable machine learning or other logic to generate embeddings associated with people's gaits. One example of the multi-person gait identification function 212 is shown in FIG. 5, which is described below.

As noted above, one challenge with face identification involves attempting to identify users at larger distances, such as up to five meters or more. This is a known issue affecting various face identification techniques, resulting in decreased confidence as distance from a camera increases. The architecture 200 can help to overcome this type of issue by processing a more significant number of pixels for each of one or more people captured in the image frames 202. This is achieved by using the multi-person face identification function 208 and the multi-person gait identification function 212 as multitask heads that are trained on shared spatiotemporal features to identify people by their faces and their unique walking patterns (gaits). If a person's face is not visible, it may be possible for the architecture 200 to generate a soft identification of the person based on his or her gait (which by itself may be unsuitable for authentication or authorization). When the person's face is or becomes visible, it is possible for the architecture 200 to combine results from face and gait identifications to produce higher-confidence identifications of people captured in the image frames 202.

A multi-person lip reading function 214 may process at least some of the spatiotemporal features to estimate what words are being spoken by one or more people captured in the image frames 202. For example, the multi-person lip reading function 214 may use features associated with key points of a person's face and mouth (which may be captured as part of the face and pose features) to estimate what that person is saying. In some cases, the multi-person lip reading function 214 may be used to process both features of the image frames 202 and features of an audio input 216, which can represent audio data of the same scene being captured in the image frames 202. In these cases, the feature extraction function 204 and the shared spatiotemporal transformer model 206 may be multi-modal and process both visual and audible data. Here, text generated by the multi-person lip reading function 214 may be used to help identify users. The audio input 216 may be obtained from any suitable source(s), such as from one or more microphones of at least one smart home device.

In other cases, the multi-person lip reading function 214 may be used separately but in conjunction with a multi-speaker automatic speech recognition (ASR) function 218, which can process the audio input 216 and convert multiple speakers' spoken words into text. The multi-speaker ASR function 218 can be used here to complement visual tracking as performed using the feature extraction function 204 and the shared spatiotemporal transformer model 206. The multi-speaker ASR function 218 can also distinguish between different speakers and can therefore generate text while identifying which speakers are associated with different portions of the text. In some cases, the multi-speaker ASR function 218 can output speaker identifiers (which represent identifiers that are uniquely associated with different speakers) and speech-text pairs. The multi-speaker ASR function 218 may use any suitable technique to identify words spoken by multiple users. When used with the multi-speaker ASR function 218, text generated by the multi-person lip reading function 214 and text generated by the multi-speaker ASR function 218 can be provided to a voice identification matching function 220, which can determine when text estimated using the multi-person lip reading function 214 matches or is adequately similar to text generated using the multi-speaker ASR function 218. When a match is found (at least to within some threshold level of similarity), the architecture 200 can associate the texts and use the texts to assist with user identification.

Figures 7, 8:
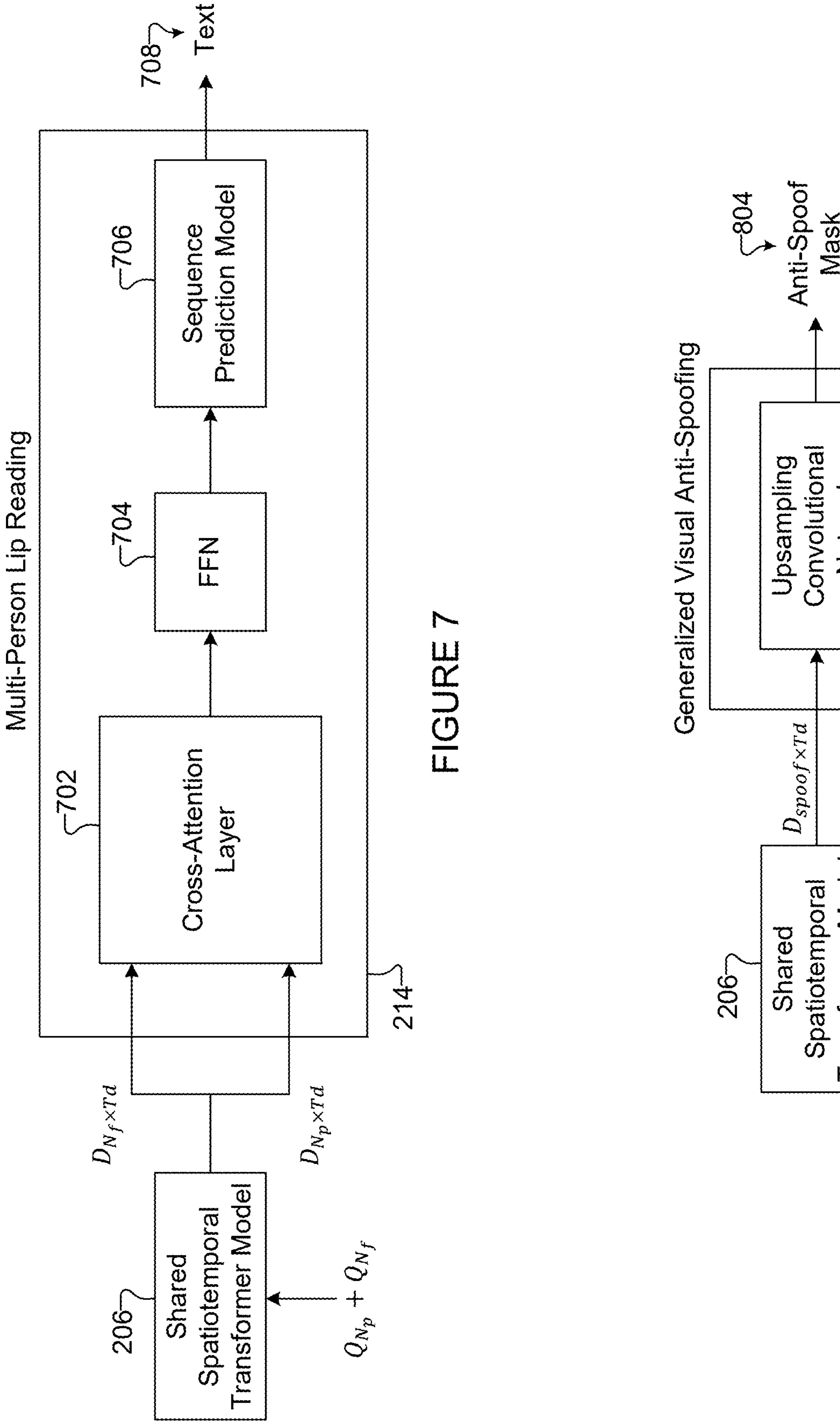
FIG. 7 illustrates an example multi-person lip reading function in the architecture of FIG. 2 in accordance with this disclosure.
FIG. 8 illustrates an example generalized visual anti-spoofing function in the architecture of FIG. 2 in accordance with this disclosure.

The multi-person lip reading function 214 may use any suitable machine learning or other logic to estimate words spoken by people captured in image frames. For example, the multi-person lip reading function 214 may perform cross-attention using various face and pose features associated with the people captured in the image frames 202. One example of the multi-person lip reading function 214 is shown in FIG. 7, which is described below.

One issue with user identification described above involves various types of presentation attacks, such as spoofing attacks. To help provide improved user identification and access control, a generalized visual anti-spoofing function 222 processes at least some of the spatiotemporal features to estimate if any potential spoofing is detected. The results of the generalized visual anti-spoofing function 222 may take any suitable form. In some cases, the generalized visual anti-spoofing function 222 may generate a segmentation map that classifies if one or more patches or other portions of an image frame 202 are bona fide or associated with a spoofing attempt (and, if so, the estimated type of spoofing detected). As a particular example, the generalized visual anti-spoofing function 222 may be trained to identify three classes of patches or other portions of an image frame 202, namely bona fide patches, spoofed patches, and background patches associated with background of a scene. The generalized visual anti-spoofing function 222 may be optimized to detect spoofing attacks for multiple identification tasks, such as face identification and gait identification. The generalized visual anti-spoofing function 222 can also be trained to ignore false positive tracking of people shown in pictures, prints, or on display screens (like tablets or televisions). The generalized visual anti-spoofing function 222 may use any suitable machine learning or other logic to identify potential spoofing attacks. One example of the generalized visual anti-spoofing function 222 is shown in FIG. 8, which is described below.

The results from various functions in the architecture 200 are provided to a user identification fusion function 224, which processes the results in order to determine whether one or more people captured in the image frames 202 are registered users. For example, the user identification fusion function 224 can combine face identification, gait identification, and other information to generate aggregated user data for each user, and the user identification fusion function 224 can determine whether the aggregated user data for any person matches data associated with a registered user (at least to within some threshold level of similarity). When the aggregated user data for a particular person captured in the image frames 202 adequately matches the data associated with a particular registered user, the user identification fusion function 224 can indicate that the particular person in the image frames 202 is the particular registered user. As described below, this may allow a smart home system or other system to take action based on the identity of the person. When the aggregated user data for a particular person captured in the image frames 202 does not adequately match the data associated with any registered user, the particular person in the image frames 202 may be treated as an anonymous user (who can be tracked but who may be limited in what he or she can do with a smart home system or other system).

In this example, the user identification fusion function 224 generates various outputs 226 associated with each registered or anonymous user identified in the image frames 202. For example, the outputs 226 may include a unique identifier for each registered or anonymous user and a tracking box placed around that registered or anonymous user within the image frames 202. The outputs 226 may also include any hand movements or other gestures that the registered or anonymous user is detected as having made. For instance, the information generated by the multi-person pose tracking function 210 (such as hand positions or landmarks) may be used for gesture recognition, such as to determine if one or more people are making one or more specific gestures or using sign language (which may potentially be used as input for one or more tasks). The outputs 226 may further include any specific utterances or dialog involving the registered or anonymous user. Note that the outputs 226 here may be incomplete or partial for one or more registered or anonymous users that have been detected, such as when the outputs 226 lack any gestures or utterances/dialog (due to the user not making any recognizable gestures or speaking). Also note that the outputs 226 may initially indicate that a user is anonymous (such as due to incomplete information) but later may indicate that the user is registered. Thus, for instance, the architecture 200 may start tracking a person upon entering an image frame 202, initially assign an anonymous user identifier to the person, and subsequently assign a registered user identifier to the person after a suitable user identification has been made.

The identification of one or more people within the image frames 202 may be used in any suitable manner. For example, as described below, certain authorized users may be allowed to request that certain tasks be performed, and the identification of the people who provide the requests can be used to determine whether the tasks can be performed. A wide variety of tasks may be initiated here based on user identification, such as unlocking or locking doors, making purchases online, or playing certain movies or other audio/video content.

FIG. 3 illustrates an example shared spatiotemporal transformer model 206 in the architecture 200 of FIG. 2 in accordance with this disclosure. As shown in FIG. 3, the image frames 202 are denoted as $I_{H_1W_1 \times T}$, where $H_1$ and $W_1$ represent the initial height and width of each image frame 202 (such as in pixels) and T represents the number of image frames 202. The image frames 202 are processed by the feature extraction function 204 to generate tokens that are denoted as $I_{HW \times Td}$, where H and W represent downscaled dimensions of the image frames 202 (such as in pixels) and d represents the number of dimensions in the tokens.

The shared spatiotemporal transformer model 206 in this example includes a spatiotemporal encoder 302 and a spatiotemporal decoder 304. The spatiotemporal encoder 302 processes the tokens $I_{HW \times Td}$ generated by the feature extraction function 204 in order to generate embeddings, which are denoted as $E_{HW \times Td}$. The embeddings $E_{HW \times Td}$ represent the tokens $I_{HW \times Td}$ as projected into a feature or latent space. In some cases, the spatiotemporal encoder 302 can perform self-attention over the HW dimensions when processing the tokens $I_{HW \times Td}$ in order to generate the embeddings $E_{HW \times Td}$. The spatiotemporal decoder 304 processes the embeddings $E_{HW \times Td}$ generated by the spatiotemporal encoder 302 in order to generate decoded spatiotemporal features. For instance, the spatiotemporal decoder 304 can generate a set of spatiotemporal features for each person captured in the image frames 202. The set of features for each person can include facial features $D_{N_f \times Td}$ of the person and pose features $D_{N_p \times Td}$ of the person over time. In some cases, the spatiotemporal decoder 304 can perform query-to-spatial multi-head sparse attention to produce the set of features for each person. In some embodiments, the design of a spatiotemporal detection transformer as disclosed in "End-to-End Object Detection with Transformers," Computer Vision—ECCV 2020: 16th European Conference, August 2020 (which is hereby incorporated by reference in its entirety)

may be used as the basis of the design for the shared spatiotemporal transformer model 206.

In this example, the spatiotemporal decoder 304 can use queries to represent feature vectors corresponding to single-person features at specific times. These queries can be denoted as $Q_{N_p}$ for pose queries and $Q_{N_f}$ for face queries, and the spatiotemporal decoder 304 is trained to learn the pose queries $Q_{N_p}$ and the face queries $Q_{N_f}$. More specifically, these queries are used to provide attention in the spatiotemporal decoder 304. Using a fixed number $N_p=N_f$ of learnable person queries, the spatiotemporal decoder 304 can be used to produce a comprehensive set of features that capture each person's representation in the image frames 202 over time. In some embodiments, for example, the set of features for each person can include that person's entire body pose (including body, hands, and face dense landmarks), face parsing, and other information.

As shown in FIG. 3, the facial features $D_{N_f \times Td}$ of each person can be provided to the multi-person face identification function 208 for use. Also, the pose features $D_{N_p \times Td}$ of each person can be provided to the multi-person pose tracking function 210 for use. The multi-person pose tracking function 210 can generate pose features or embeddings, which are denoted as $P_{N_p \times f}$ and are provided to the multi-person gait identification function 212 for use. The features or embeddings $P_{N_p \times f}$ used for gait identification may span a larger range of image frames 202 than needed to perform face identification or pose tracking, such as when gait identification uses image frames 202 captured over multiple seconds (like three to six seconds).

FIG. 4 illustrates an example multi-person pose tracking function 210 in the architecture 200 of FIG. 2 in accordance with this disclosure. As shown in FIG. 4, the multi-person pose tracking function 210 receives and processes the pose features $D_{N_p \times Td}$ of each person captured in the image frames 202. In this example, the pose features $D_{N_p \times Td}$ are processed using a multi-layer perceptron (MLP) network 402, which is trained to identify a root joint 404 of each person captured in the image frames 202 (if possible). The root joint 404 may represent any suitable joint or other location of a person, such as the person's pelvis. The pose features $D_{N_p \times Td}$ are also processed using an MLP network 406, which is trained to generate person occurrence predictions 408. Each person occurrence prediction 408 represents a prediction as to whether a person is actually present at a certain location within the image frames 202.

The pose features $D_{N_p \times Td}$ are further processed using an MLP network 410, which is trained to identify two-dimensional (2D) joint offsets 412. The 2D joint offsets 412 represent locations of specified joints of a person, such as relative to the root joint of that person. For instance, the 2D joint offsets 412 may identify distances of specified joints (such as in x and y directions) from the root joint. In addition, the pose features $D_{N_p \times Td}$ are processed using an MLP network 414, which is trained to identify 3D joint forward kinematics 416. The 3D joint forward kinematics 416 define how limbs of a person may be positioned and oriented based on specified values for joint parameters.

In some embodiments, the multi-person pose tracking function 210 may operate as follows. The multi-person pose tracking function 210 simultaneously estimates the pose and skeleton of each detected person in the image frames 202 relative to a neutral posture. In some cases, the neutral posture may represent a "T pose" in which a person's arms are extended outward and the person's legs are together, effectively forming a "T" shape. To determine the global 3D position of a person's particular joint, a transformation can be performed using forward kinematics as a function of rotation and translation/scale, which modify the neutral pose starting from the root joint leading up to that particular joint.

In some embodiments, the multi-person pose tracking function 210 may be trained using accurate annotations of at least one synthetic dataset. The training objective may be to minimize the Euclidean 3D distance between a joint prediction resulting from forward kinematics and a joint ground truth. The synthetic dataset(s) could include 2D projections of 3D ground truth poses and 3D distances between a camera's center and any landmark/joint. To estimate an approximate distance between a joint ground truth and its prediction in 3D space, an intermediate 2D pose estimation may be utilized to determine the angle formed by the joint ground truth, the camera's center, and the joint prediction. Assuming that the distance between the line of view of the joint prediction (camera-to-joint line) and the actual 3D point of the joint ground truth is minimal, the Pythagorean theorem could be applied to the known camera-joint ground truth distance in 3D, and the angle can produce a 3D distance estimation. A loss suitable for use during backpropagation can be obtained, such as by utilizing the Hungarian algorithm (a combinatorial optimization algorithm) to identify the best matches between the prediction and target pose trajectories. After finding the best permutation, the predictions that match can be used to calculate losses for the person occurrence, 2D joint offset, and 3D joint forward kinematics predictions, and other predictions may only be considered to calculate the loss for the person occurrence predictions. Tracking may be achieved by suitable matching of poses for two or more consecutive frames.

Note that the loss function used during training can help to prevent the multi-person pose tracking function 210 from generating pose predictions that are not likely or possible. For example, a specific person's body may be partially occluded in the image frames 202, such as due to the presence of another person or object in front of the specific person. The loss function used here can train the multi-person pose tracking function 210 to identify poses for the specific person's body that are physically possible, such as by preventing predictions that require the specific person's joints to bend in unnatural or impossible ways. As a result, the multi-person pose tracking function 210 can be trained to generate pose predictions that are realistic. In some cases, this can be achieved by using one or more training datasets that are based on medical 3D models or other 3D models that accurately define realistic ranges of motion and articulations for different joints.

Each MLP network 402, 406, 410, 414 can be implemented using any suitable machine learning or other logic to generate the described outputs. For example, each MLP network 402, 406, 410, 414 may represent a fully-connected multi-layer neural network. As a particular example, each MLP network 402, 406, 410, 414 may include an input layer that receives latent vectors, hidden layers that collectively process the latent vectors using (among other things) non-linear activation functions, and an output layer that provides root joint, person occurrence, 2D joint offset, or 3D joint forward kinematic predictions based on outputs from the final hidden layer.

FIG. 5 illustrates an example multi-person gait identification function 212 in the architecture 200 of FIG. 2 in accordance with this disclosure. As shown in FIG. 5, the multi-person gait identification function 212 receives pose data 502 defining poses of one or more people over time as input. The pose data 502 may, for instance, represent outputs from the multi-person pose tracking function 210. The pose data 502 is provided to a gait transformer model 504, which processes the pose data 502 in order to generate embeddings. For example, the multi-person gait identification function 212 may generate different embeddings that represent different people's gaits. In some embodiments, the gait transformer model 504 may represent a self-supervised transformer model using contrastive loss. The gait transformer model 504 can be trained to generate embeddings that are closer in a latent space for similar gaits and more distance in the latent space for dissimilar gaits.

The embeddings generated by the gait transformer model 504 are provided to a gait identification function 506, which can compare the embeddings generated by the gait transformer model 504 to known embeddings 508 associated with known or previously-identified users. The gait identification function 506 can use any suitable technique to determine whether embeddings generated by the gait transformer model 504 are similar to any of the known embeddings 508, such as cosine similarity. In some cases, the gait identification function 506 may associate a unique gait identifier with each person, where the gait identifier represents either (i) the identifier of a known or registered user having the same or substantially similar gait or (ii) an identifier associated with an anonymous or unidentified user having a dissimilar gait.

This type of model-based approach for gait identification can rely on accurate 3D pose estimation, which can be achieved using the multi-person pose tracking function 210 described above. Moreover, this type of model-based approach for gait identification can be particularly robust compared to appearance-based techniques (like silhouette segmentation) by accurately representing human gaits using 3D joint coordinates. Again, this can be achieved using the multi-person pose tracking function 210 described above.

FIG. 6 illustrates an example multi-person face identification function 208 in the architecture 200 of FIG. 2 in accordance with this disclosure. As shown in FIG. 6, the multi-person face identification function 208 receives and processes the facial features $D_{N_f \times Td}$ of each person captured in the image frames 202. In this example, the facial features $D_{N_f \times Td}$ are processed using an MLP network 602, which is trained to identify a center 604 of each person's face captured in the image frames 202. The facial features $D_{N_f \times Td}$ are also processed using an MLP network 606, which is trained to generate face occurrence predictions 608. Each face occurrence prediction 608 represents a prediction as to whether a person's face is actually present at a certain location within the image frames 202.

It may be routine for a person's face to be partially visible in the image frames 202, such as due to the person's face being partially occluded (like by another person or object) or due to the person not facing the camera directly. A knowledge distillation function 610 in the multi-person face identification function 208 can therefore be used to help reconstruct a person's face based on the contents of the image frames 202. For example, a feature pyramid network (FPN) 612 can be used to process the facial features $D_{N_f \times Td}$ and generate predictions based on the facial features $D_{N_f \times Td}$. The feature pyramid network 612 typically includes two sets of convolutional neural network layers or other network layers, where a first set processes the facial features $D_{N_f \times Td}$ using network layers of decreasing size and a second set processes the outputs of the first set using network layers of increasing size (with lateral connections between the two sets).

The predictions by the feature pyramid network 612 are used by an alignment-aware face reconstruction function 614, which can generate a reconstructed version of a person's face based on the predictions. For example, the alignment-aware face reconstruction function 614 can be used to generate a cropped, scaled, and rotated version of a region of interest (meaning a person's face) relative to the face center. This implies that the alignment-aware face reconstruction function 614 learns an affine transform or other transform for face alignment. The alignment-aware face reconstruction function 614 can use any suitable technique for generating reconstructed versions of people's faces.

A pretrained face identification module 616 may be used during training of the multi-person face identification function 208 to analyze the reconstructed versions of people's faces. In some embodiments, the pretrained face identification module 616 may represent the SFace face recognition model. The pretrained face identification module 616 can act as a teacher during knowledge distillation training by consuming the optimally-aligned reconstructed faces generated using the alignment-aware face reconstruction function 614. Note that during inferencing operations (after training is completed), the pretrained face identification module 616 may be omitted or not used to process the outputs of the alignment-aware face reconstruction function 614.

The facial features $D_{N_f \times Td}$ and the outputs of the alignment-aware face reconstruction function 614 are processed using an MLP network 618, which is trained to generate face predictions. Each face prediction can represent an embedding of the features of a person's face as captured in the image frames 202 (and possibly reconstructed). The embeddings generated by the MLP network 618 are provided to a face identification function 620, which can compare the embeddings generated by the MLP network 618 to known face embeddings 622 associated with known or previously-identified users. The face identification function 620 can use any suitable technique to determine whether embeddings generated by the MLP network 618 are similar to any of the known embeddings 622, such as cosine similarity. In some cases, the face identification function 620 may associate a unique face identifier with each person's face, where the face identifier represents either (i) the identifier of a known or registered user's face or (ii) an identifier associated with an anonymous or unidentified user.

In some embodiments, the multi-person face identification function 208 may be trained using accurate annotations of at least one synthetic dataset. For example, the multi-person face identification function 208 may be trained end-to-end using one or more synthetic datasets that provide diversity of ethnicity, sex, and age. In some cases, facial expression transitions can be animated using people captured in the training dataset(s). One challenge of using full body information from the shared spatiotemporal transformer model 206 is that the multi-person face identification function 208 might learn correlations between gaits and faces (instead of features for face identification alone). To address this, the multi-person face identification function 208 can operate based on knowledge distillation using a separate set of face-related queries $Q_{N_f}$ learned by the spatiotemporal decoder 304 of the shared spatiotemporal transformer model 206 (rather than the pose-related queries $Q_{N_p}$). The pose-related queries $Q_{N_p}$ could introduce excessive noise into the training of the multi-person face identification function 208 since the pose-related queries $Q_{N_p}$ are not focused on people's faces, while the face-related queries $Q_{N_f}$ are related specifically to people's faces in the image frames 202.

FIG. 7 illustrates an example multi-person lip reading function 214 in the architecture 200 of FIG. 2 in accordance with this disclosure. As shown in FIG. 7, the multi-person lip reading function 214 receives and processes the facial features $D_{N_f \times Td}$ and the pose features $D_{N_p \times Td}$ of each person captured in the image frames 202. A cross-attention layer 702 processes the facial and pose features in order to compute cross-attention between the different types of features, which can determine interdependencies between the various features. The cross-attention layer 702 thereby allows the features of different modalities to be merged. Among other things, the use of cross-attention can help to achieve feature alignment and alleviate model overfitting.

The combined features are provided to a feed forward network (FFN) 704, which can non-linearly transform each of the combined features independently. In some cases, the feed forward network 704 represents a fully-connected network. The transformed features generated by the feed forward network 704 are provided to a sequence prediction model 706, which generates text 708 based on the transformed features. For instance, the sequence prediction model 706 can represent a natural language understanding (NLU) model trained to generate text based on the transformed features. As a particular example, the sequence prediction model 706 may represent a cascaded seq2seq NLU model.

FIG. 8 illustrates an example generalized visual anti-spoofing function 222 in the architecture 200 of FIG. 2 in accordance with this disclosure. As shown in FIG. 8, the shared spatiotemporal transformer model 206 is trained to learn the pose queries $Q_{N_p}$ and the face queries $Q_{N_f}$. The spatiotemporal nature of the shared spatiotemporal transformer model 206 also allows multiple techniques to be used to identify spoofing attacks and to classify the spoofing attacks by type.

To support this, the shared spatiotemporal transformer model 206 is also trained to learn spoofing queries, which are denoted as $Q_{spoof}$. The spoofing queries $Q_{spoof}$ can be used to provide attention and train the shared spatiotemporal transformer model 206 how to identify whether spoofing is occurring (and, if so, what type of spoofing is occurring). This trains the shared spatiotemporal transformer model 206 to generate decoded spoofing features $D_{spoof \times Td}$ based on the image frames 202 being processed. In some cases, different types or classes of spoofing queries $Q_{spoof}$ may be used, such as one class for identifying bona fide (non-spoofed) pixels, one class for identifying spoofed pixels, and one class for identifying background in the image frames 202.

The generalized visual anti-spoofing function 222 receives and processes the spoofing features $D_{spoof \times Td}$ using an upsampling convolutional network 802, which generates anti-spoof masks 804 based on the spoofing features $D_{spoof \times Td}$. The upsampling convolutional network 802 is trained to upsample the resolution of the features and determine whether the features are indicative of a spoofing attempt. In some cases, the upsampling convolutional network 802 may function much like a transformer decoder, and the upsampling convolutional network 802 may be aided by auxiliary supervision. Also, in some cases, the type of spoofing may be determined or complemented by performing regression of the location and size of any spoofed patches of pixels in an image frame 202. Each anti-spoof mask 804 can identify areas of image frames 202 where spoofing has been detected and optionally the type of spoofing detected.

In some embodiments, the generalized visual anti-spoofing function 222 is trained using accurate annotations of at least one synthetic dataset. In some cases, the synthetic dataset(s) may represent spoofed patches based on 2D Gaussian distributions, where each patch's location and size match a multivariate Gaussian mean and standard deviation. It is also possible to increase the dataset diversity by combining multiple spoofing attacks or multiple types of spoofing attacks into a single image frame 202. As a particular example, collage stitching may be used to create multiple spoofing attacks or multiple types of spoofing attacks in common image frames 202.

Note that some previous approaches for anti-spoofing are used after user detection has been completed. This means that these approaches attempt to identify if spoofing is occurring after users have been detected and identified, and these approaches attempt to determine if each individual user is associated with a spoofing attack. In the architecture 200, anti-spoofing can be performed for all people captured in the image frames 202 using one-shot semantic segmentation, which can occur more quickly. The results of the generalized visual anti-spoofing function 222 can also be used during user identification.

Although FIGS. 2 through 8 illustrate one example of an architecture 200 for robust and long-range multi-person identification using multi-task learning and various details, various changes may be made to FIGS. 2 through 8. For example, various components and functions in each of FIGS. 2 through 8 may be combined, further subdivided, replicated, rearranged, or omitted according to particular needs. Also, one or more additional components and functions may be included in each of FIGS. 2 through 8 if needed or desired. As a particular example, one or more functions that process the outputs of the shared spatiotemporal transformer model 206 may be omitted, or one or more additional functions that process the outputs of the shared spatiotemporal transformer model 206 may be added. As another particular example, one or more of the functions 208, 210, 212, 214, 222 may be implemented separate from the shared spatiotemporal transformer model 206 and may not rely on the outputs of the shared spatiotemporal transformer model 206.

Figure 9:
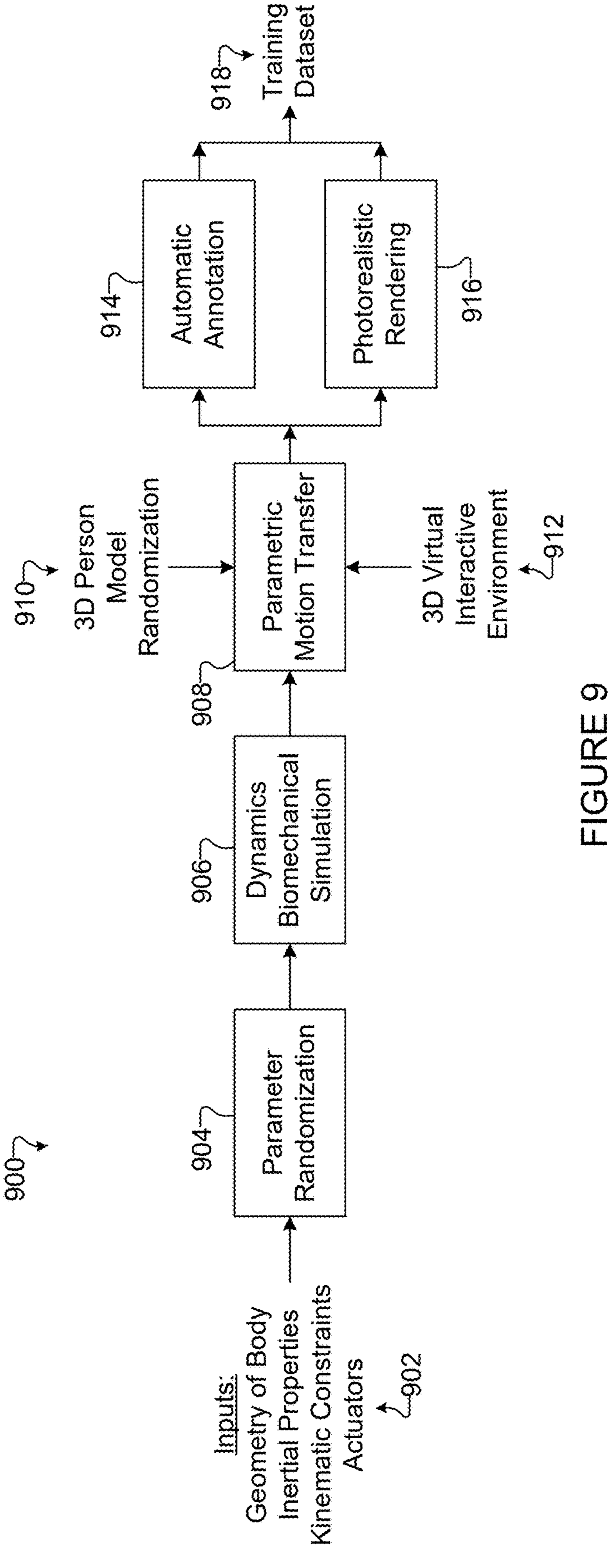
FIG. 9 illustrates an example architecture for generating training data for a shared spatiotemporal transformer model in accordance with this disclosure.

FIG. 9 illustrates an example architecture 900 for generating training data for a shared spatiotemporal transformer model in accordance with this disclosure. For ease of explanation, the architecture 900 shown in FIG. 9 is described as being implemented on or supported by the electronic device 101 in the network configuration 100 of FIG. 1. However, the architecture 900 shown in FIG. 9 could be used with any other suitable device(s) and in any other suitable system(s), such as when the architecture 900 is implemented on or supported by the server 106.

As described above, the architecture 200 can be trained to perform various functions related to user identification, including gait identification. During training, it can be useful or desirable to have accurate annotations for identifying characteristics of people (such as people's gaits) in training data, but obtaining accurate annotations for training data can time-consuming and costly. Thus, synthetic training datasets may be generated and used for training purposes. The architecture 900 shown in FIG. 9 can support the generation of such synthetic training datasets, such as by using biomechanical simulations and 3D rendering techniques.

In this example, various inputs 902 can be received, and the inputs can be used to define a human body model. In this particular example, the inputs 902 can define the geometry of the human body model and inertial properties (such as possible variations in centers of mass, weights, and bone structures) of the human body model. The inputs 902 can also define kinematic constraints, which can include characteristics like the possible range of motion for each of various joints in the human body model. The inputs 902 can further define actuators (muscles) that can move limbs or other portions of the human body model. In some cases, these characteristics can be based on medical research or medical models of the human body.

A parameter randomization function 904 can select random values for the various characteristics defined by the human body model. For example, the parameter randomization function 904 may generate randomized parameter values for the human body model based on population statistics. The human body model and the randomized parameters are provided to a dynamics biomechanical simulation function 906, which prepares a dynamics simulation of the human body model based on the randomized parameters. The dynamics simulation can model how the human body model behaves during various movements.

A parametric motion transfer function 908 can use the dynamics simulation of the human body model to simulate movements of the human body. This can be based on a 3D person model randomization 910, which can identify random movements to be simulated by the human body model. This can also be based on a 3D virtual interactive environment, such as a game engine, which can define the environment in which the human body model is moving. In some cases, the parametric motion transfer function 908 may incorporate gait from a simulation library (such as the OpenSim library), facial expressions, and hand movements (possibly including sign language) when simulating the movements of the human body.

An automatic annotation function 914 analyzes the results of the parametric motion transfer to identify various landmarks, joint positions, segmentation masks, etc. associated with the simulated movements of the human body. These values may be determined with certainty since the parametric motion transfer function 908 is simulating known movements of the known human body model. A photorealistic rendering function 916 can be used to generate photo-realistic images of people based on the results of the parametric motion transfer. The photorealistic rendering function 916 may generate any suitable visual effects to generate photo-realistic images, such as light variations, lens distortion, and noise. The annotations and the photo-realistic images may be used to form a training dataset 918.

In some cases, the success of training the architecture 200 can be at least partially due to rich and accurate annotations of one or more training datasets. In some embodiments, the architecture 200 may be trained using a collection of synthetically-generated video snippets. Each video snippet may have any suitable length, such as up to about ten seconds in duration or longer. Each video snippet may also contain any suitable number of people, such as up to 20 people or more. Each video snippet may be limited to one scene or a limited number of scenes, and each video snippet may include the people performing everyday indoor household tasks or other tasks. Here, the synthetically-generated video snippets can be generated using the architecture 900 and can include human movements that are the biomechanically correct result of parametric simulations. As a particular example, each video frame may include annotations for each person's entire body pose (including feet, hands, dense face key points, and human musculoskeletal structure), body, joints, constraints, forces, contact geometry, markers, and controllers/muscle actuators. This type of training data can be used to train the architecture 200 in order to effectively perform user identification or other identity-aware functions.

Although FIG. 9 illustrates one example of an architecture 900 for generating training data for a shared spatiotemporal transformer model, various changes may be made to FIG. 9. For example, various components and functions in FIG. 9 may be combined, further subdivided, replicated, rearranged, or omitted according to particular needs. Also, one or more additional components and functions may be included in FIG. 9 if needed or desired. In addition, the architecture 200 may be trained using any other suitable training data, and that training data may be collected, generated, or otherwise obtained in any suitable manner.

The architecture 200 described above may be used in any number of applications to perform user identification and other functions based on user identification. The following provides example use cases for the architecture 200. However, these use cases are for illustration and explanation only, and the architecture 200 may be used in any other suitable manner.

Broadly speaking, the architecture 200 may be used in any number of applications where identification, authentication, access control, or other identity-based functions are performed. For example, with respect to access control, certain areas may need to be restricted from general access in smart homes and other locations, such as workshop rooms, at-home offices, or private rooms in adversarial environments like vacation home rentals. Ensuring that only authorized individuals are allowed entry to these privileged locations may be needed or desired, and the tracking and identification capabilities of the architecture 200 can reduce the friction of securing these areas by silently granting secure access based on user biometrics.

As another example, with respect to surveillance and intrusion detection, monitoring for intrusions and monitoring activities can be key functions when securing a smart home or other location. Utilizing the architecture 200 to quietly track and identify unregistered individuals can help homeowners or other personnel detect potential threats or respond to suspicious behaviors. The architecture 200 also allows for more efficient and effective storage of security footage, such as when recordings are triggered only when strangers are present. Among other things, this can help to reduce or avoid making residents or other legitimate individuals feel uncomfortable under constant surveillance.

With respect to non-intrusive person identification at distance, a person's face or gestures at a distance may not always be visible. By tracking gait at a distance, the architecture 200 can pre-identify (with a higher confidence) who people are and track them. This can be done for one user or multiple users. Once a user comes closer to a camera or microphone, such as when the user's face, lips, or voice become visible or audible, the architecture 200 can use additional information to further improve overall confidence and make the identification of various people more robust with a high degree of accuracy. Other example use cases may include companion nannies for children, smart parental control systems, and family-based food delivery ordering systems.

As a particular example use case, consider the problem of user onboarding. Previous systems may require that an administrative user follow a tedious process to provide access to his or her friends and family members, such as by using a smart home application. The administrative user may need to perform tasks like entering personal details (such as a new user's name, email address, and phone number) so that an invitation can be sent to the new user, and the new user would typically need to accept the invitation and complete the onboarding process in order to gain access to the system.

Using the architecture 200, the following type of exchange may occur. In the following, it is assumed that a SAMSUNG smart home device supporting the BIXBY virtual assistant is being used.

Addison (administrative user): Hi, BIXBY. [BIXBY already knows who is speaking based on received data, such as from a television with a camera and a microphone, and BIXBY may determine that the known speaker is accompanied by an unknown person.]

BIXBY: Hi, Addison. How can I serve you?

Addison: I'd like to introduce you to my friend Adrian, who is staying for two weeks. Please make Adrian feel at home. [BIXBY determines that Addison makes a gesture pointing to the unknown person and keeps track of the unknown person, including the person's name and biometrics like gait identifier, face identifier, or voice identifier].

BIXBY: Hi, Adrian. Welcome home. Can I store your biometrics? They will help me understand your needs and facilitate using the devices and spaces at home. They will be deleted when they are no longer in use.

Adrian: Yes, please. [BIXBY stores Adrian's data and grants guest access for two weeks. If required, BIXBY will continue learning Adrian's biometrics. At the end of the two weeks, Adrian's data will be deleted as it is no longer needed.]

As can be seen here, the onboarding of a new user is much simpler.

As another particular example use case, consider interactive multi-user task authorization and smart parental control. In some cases, administrative permission may be necessary for certain smart devices. For example, when a movie is rented from a shared smart device, parental controls may prevent the movie from being rented until an administrative user provides a password or other approval. This may occur even if the user who initiated the transaction request is the administrative user.

Using the architecture 200, the following type of exchange may occur.

Child: What do you want to watch tonight for movie night?

Parent: It's your turn to choose.

Child: Hi, BIXBY. What are the latest movies?[BIXBY identifies the presence of an adult and a child and triggers a parental control policy that allows children to use the television during night hours while filtering inappropriate content.]

BIXBY: What about that new movie everyone's been talking about?[BIXBY displays the latest movie list and highlights the identified movie.]

Child: Hi, BIXBY, let's do it.

BIXBY: Please confirm that you want to rent [movie].

Parent: [Unable to speak while eating, the parent gestures OK with his or her hand or uses another preregistered hand gesture to authorize the rental.]

BIXBY: [Recognizes the gesture, completes the rental, and starts playing the movie.]

As can be seen here, the ability to authorize a transaction is much simpler.

Again, it should be noted here that these examples of applications or use cases are for illustration and explanation only. Any number of possible functions may be performed based on user identification, and these possible functions may be performed in any suitable environments.

Figure 10:
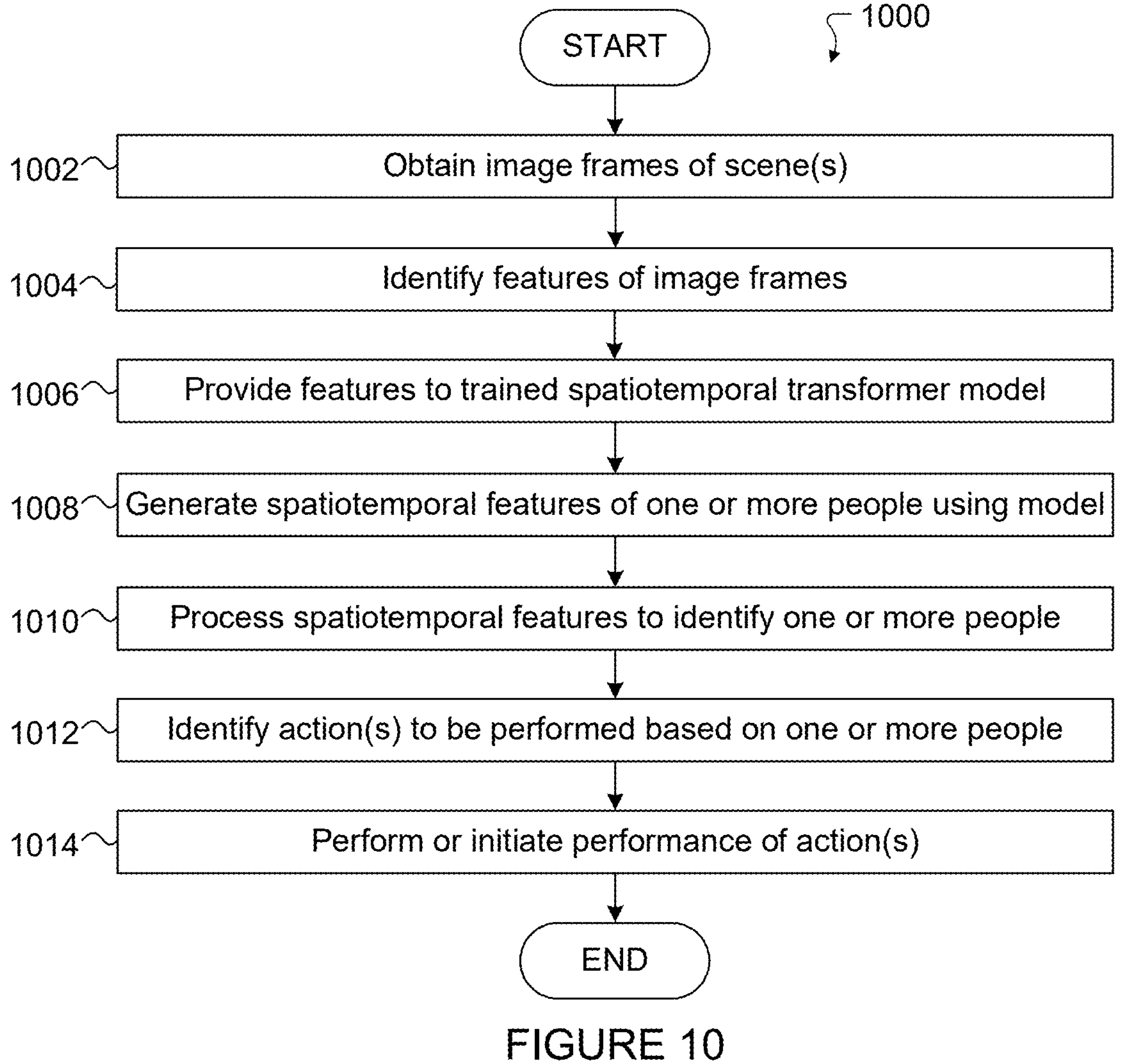
FIG. 10 illustrates an example method for robust and long-range multi-person identification using multi-task learning in accordance with this disclosure.

FIG. 10 illustrates an example method 1000 for robust and long-range multi-person identification using multi-task learning in accordance with this disclosure. For ease of explanation, the method 1000 shown in FIG. 10 is described as being performed by the electronic device 101 in the network configuration 100 of FIG. 1, where the electronic device 101 can implement the architecture 200 shown in FIG. 2. However, the method 1000 shown in FIG. 10 could be performed by any other suitable device(s) and architecture(s) and in any other suitable system(s), such as when the method 1000 is performed using the server 106.

As shown in FIG. 10, image frames of one or more scenes are obtained at step 1002. This may include, for example, the processor 120 of the electronic device 101 obtaining image frames 202 from one or more smart home devices or other devices. The image frames 202 may capture one or more people in the one or more scenes, such as within one or more areas in or around a home. This may also include the processor 120 of the electronic device 101 pre-processing the image frames 202, such as to perform noise reduction or other pre-processing function(s). Features of the image frames are identified at step 1004. This may include, for example, the processor 120 of the electronic device 101 performing the feature extraction function 204 in order to generate tokens $I_{HW \times Td}$ representing at least some of the contents of the image frames 202.

The features are provided to a trained spatiotemporal transformer model at step 1006. This may include, for example, the processor 120 of the electronic device 101 providing the tokens to the shared spatiotemporal transformer model 206. Spatiotemporal features of one or more people in the image frames are generated using the trained spatiotemporal transformer model at step 1008. This may include, for example, the processor 120 of the electronic device 101 using the spatiotemporal encoder 302 and the spatiotemporal decoder 304 of the shared spatiotemporal transformer model 206 to generate decoded spatiotemporal features for each person captured in the image frames 202. As a particular example, the shared spatiotemporal transformer model 206 may be used to generate facial features $D_{N_f \times Td}$ of each person and pose features $D_{N_p \times Td}$ of each person over time.

The spatiotemporal features are processed to identify one or more people captured in the image frames at step 1010. This may include, for example, the processor 120 of the electronic device 101 performing the various functions 208, 210, 212, 214, 222, 224 in order to identify one or more people captured in the image frames 202. One example technique for processing the spatiotemporal features is provided in FIG. 11, which is described below.

The identity or identities of the one or more people may be used in any suitable manner. For example, one or more actions to be performed may be identified based on the one or more identified people at step 1012, and the one or more actions can be performed or initiated at step 1014. This may include, for example, the processor 120 of the electronic device 101 determining that one or more tasks should be performed based on one or more commands, gestures, or other inputs from at least one authorized or registered user. This may also include the processor 120 of the electronic device 101 initiating or performing the one or more tasks. Note that the task or tasks to be performed here may vary widely based on the application. Also note that the identity of one or more users may be used in any other suitable manner.

Although FIG. 10 illustrates one example of a method 1000 for robust and long-range multi-person identification using multi-task learning, various changes may be made to FIG. 10. For example, while shown as a series of steps, various steps in FIG. 10 may overlap, occur in parallel, occur in a different order, or occur any number of times (including zero times). Also, while not shown here, audio data may be received and processed, such as when the audio data is used during step 1010 to assist with identifying one or more people captured in the image frames 202.

FIG. 11 illustrates an example method 1100 for processing spatiotemporal features during multi-person identification in accordance with this disclosure. For ease of explanation, the method 1100 shown in FIG. 11 is described as being performed by the electronic device 101 in the network configuration 100 of FIG. 1, where the electronic device 101 can implement the architecture 200 shown in FIG. 2. However, the method 1100 shown in FIG. 11 could be performed by any other suitable device(s) and architecture(s) and in any other suitable system(s), such as when the method 1100 is performed using the server 106.

As shown in FIG. 11, spatiotemporal features of an image frame are obtained at step 1102. This may include, for example, the processor 120 of the electronic device 101 receiving the facial features $D_{N_f \times Td}$, pose features $D_{N_p \times Td}$, and spoofing features $D_{spoof \times Td}$ generated by the shared spatiotemporal transformer model 206. Face identification is performed based on at least some of the spatiotemporal features at step 1104. This may include, for example, the processor 120 of the electronic device 101 performing the multi-person face identification function 208 using the facial features $D_{N_f \times Td}$ for each person in the image frame 202. Among other things, the processor 120 may generate embeddings representing faces of at least some of the people in the image frame 202.

Pose and gait identification are performed based on at least some of the spatiotemporal features at step 1106. This may include, for example, the processor 120 of the electronic device 101 performing the multi-person pose tracking function 210 using the pose features $D_{N_p \times Td}$ for each person in the image frame 202. This may also include the processor 120 of the electronic device 101 performing the multi-person gait identification function 212 using the pose data 502 generated by the multi-person pose tracking function 210 for each person in the image frame 202. Among other things, the processor 120 may generate embeddings representing poses and gaits of at least some of the people in the image frame 202.

Gesture recognition may be performed based on at least some of the spatiotemporal features at step 1108. This may include, for example, the processor 120 of the electronic device 101 using the results from the pose estimation for each person in the image frame 202 to determine whether that person appears to be making at least one specified gesture. Lip reading may be performed based on at least some of the spatiotemporal features at step 1110. This may include, for example, the processor 120 of the electronic device 101 performing the multi-person lip reading function 214 using the results from the face and pose estimations for each person in the image frame 202.

An attempt is made to generate a visual user identifier associated with at least one person in the image frame at step 1114. This may include, for example, the processor 120 of the electronic device 101 determining if adequate information is available to assign at least a temporary identifier to at least one person in the image frame 202 based on the image contents. If not, the process can return to step 1102 to process additional spatiotemporal features, such as for the next image frame 202. Otherwise, the identifier and data related to the at least one person (such as the results of the face identification and gait identification) can be provided for use during a data fusion operation.

At least some of the spatiotemporal features of the image frame are also processed to perform generalized anti-spoofing at step 1116. This may include, for example, the processor 120 of the electronic device 101 performing the generalized visual anti-spoofing function 222 to process the spoofing features $D_{spoof \times Td}$. The generalized visual anti-spoofing function 222 can generate an anti-spoof mask 804 associated with the image frame 202. The anti-spoof mask 804 can also be provided for use during the data fusion operation.

If audio data is available, the audio data can be pre-processed at step 1118. This may include, for example, the processor 120 of the electronic device 101 performing noise reduction or other pre-processing function(s). Multi-speaker automatic speech recognition is performed at step 1120, and a transcript of one or more speakers is generated at step 1122. This may include, for example, the processor 120 of the electronic device 101 performing the multi-speaker ASR function 218 to generate text based on spoken dialog contained in the audio data.

An attempt is made to generate an audible user identifier associated with at least one person in the image frame at step 1124. This may include, for example, the processor 120 of the electronic device 101 determining if adequate information is available to assign at least a temporary identifier to at least one person in the image frame 202 based on the audio data. If not, the process can return to step 1118 to process additional audio data. Otherwise, the identifier and data related to the at least one person (such as the transcript of words spoken) can be used during a data fusion operation.

The data fusion operation is performed to identify one or more people captured in the image frame(s) at step 1128. This may include, for example, the processor 120 of the electronic device 101 performing the user identification fusion function 224, which can fuse all of the results obtained by the visual (and potentially audio) processing in order to determine whether at least one person captured in the image frame(s) 202 is a registered user. In some cases, the results obtained by the individual processing functions may have lower confidences in the identification of a person, but fusing the results can produce an identification having a higher confidence (and possibly a much higher confidence).

Although FIG. 11 illustrates one example of a method 1100 for processing spatiotemporal features during multi-person identification in accordance with this disclosure, various changes may be made to FIG. 11. For example, while shown as various series and parallel steps, various steps in FIG. 11 may overlap, occur in parallel, occur serially, occur in a different order, or occur any number of times (including zero times). As a particular example, while steps 1104-1110 are shown as occurring serially in FIG. 11, these steps may occur in parallel with one another and possibly in parallel with step 1116.

Note that the terms "multi-person" and "multi-speaker" are used in this document to indicate that certain functions like face identification, pose identification, gait identification, lip reading, and automatic speech recognition can occur for multiple people if multiple people are present in a given scene being monitored. However, these terms do not require that these functions always be performed for multiple people, and these terms do not limit the scope of this disclosure to use only with scenes containing multiple people. There are routinely situations in which a single person is present in a monitored scene (including in a single-person household or a multi-person household). Thus, functions like face identification, pose identification, gait identification, lip reading, and automatic speech recognition can occur regardless of the actual number of people present in the monitored scene.

It should be noted that the functions shown in or described with respect to FIGS. 2 through 11 can be implemented in an electronic device 101, server 106, or other device in any suitable manner. For example, in some embodiments, at least some of the functions shown in or described with respect to FIGS. 2 through 11 can be implemented or supported using one or more software applications or other software instructions that are executed by the processor 120 of the electronic device 101, server 106, or other device. In other embodiments, at least some of the functions shown in or described with respect to FIGS. 2 through 11 can be implemented or supported using dedicated hardware components. In general, the functions shown in or described with respect to FIGS. 2 through 11 can be performed using any suitable hardware or any suitable combination of hardware and software/firmware instructions. Also, the functions shown in or described with respect to FIGS. 2 through 11 can be performed by a single device or by multiple devices.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

obtaining, using at least one processing device of an electronic device, image frames capturing one or more people in at least one scene;

identifying, using the at least one processing device, features of the image frames;

providing, using the at least one processing device, the identified features to a trained spatiotemporal transformer machine learning model, the trained spatiotemporal transformer machine learning model configured to generate a set of features for each of the one or more people, the set of features for each person comprising facial features of the person and pose features of the person over time;

performing, using the at least one processing device, face identification using the facial features in each set of features to generate one or more first embeddings representing at least one face of at least one of the one or more people;

performing, using the at least one processing device, gait identification using the pose features in each set of features to generate one or more second embeddings representing at least one gait of at least one of the one or more people; and identifying, using the at least one processing device, at least one of the one or more people based on the first and second embeddings.

2. The method of claim 1, further comprising:

performing one or more actions requested by the at least one identified person;

wherein the one or more actions are determined based on input from the at least one identified person.

3. The method of claim 2, further comprising:

using landmarks associated with the at least one identified person's hands included in the pose features of the at least one identified person to identify one or more gestures made by the at least one identified person;

wherein the input from the at least one identified person comprises the one or more gestures.

4. The method of claim 1, further comprising:

performing automatic speech recognition to generate one or more first texts based on words spoken by at least one of the one or more people;

performing cross-attention using the facial features and the pose features to generate one or more second texts identifying words spoken by at least one of the one or more people; and matching at least one of the one or more first texts and at least one of the one or more second texts, the at least one of the one or more people identified based on the matched first and second texts.

5. The method of claim 1, wherein:

the set of features for each person further comprises spoofing features resulting from semantic segmentation of the image frames; and the trained spatiotemporal transformer machine learning model is configured to generate the spoofing features to identify valid pixels in the image frames, spoofed pixels in the image frames, and background in the image frames.

6. The method of claim 1, further comprising:

performing pose tracking for each of the one or more people using three-dimensional (3D) skeletal estimation for the person, wherein the pose features of each person are based on the pose tracking; and tracking at least one of the one or more people across different views or scenes.

7. The method of claim 1, wherein:

identifying the at least one of the one or more people comprises simultaneously identifying two or more people; and the two or more people are identified at a distance of at least five meters.

8. An electronic device comprising:

at least one processing device configured to:

obtain image frames capturing one or more people in at least one scene;

identify features of the image frames;

provide the identified features to a trained spatiotemporal transformer machine learning model, the trained spatiotemporal transformer machine learning model configured to generate a set of features for each of the one or more people, the set of features for each person comprising facial features of the person and pose features of the person over time;

perform face identification using the facial features in each set of features to generate one or more first embeddings representing at least one face of at least one of the one or more people;

perform gait identification using the pose features in each set of features to generate one or more second embeddings representing at least one gait of at least one of the one or more people; and identify at least one of the one or more people based on the first and second embeddings.

9. The electronic device of claim 8, wherein the at least one processing device is further configured to perform one or more actions requested by the at least one identified person, the one or more actions based on input from the at least one identified person.

10. The electronic device of claim 9, wherein:

the at least one processing device is further configured to use landmarks associated with the at least one identified person's hands included in the pose features of the at least one identified person to identify one or more gestures made by the at least one identified person; and the input from the at least one identified person comprises the one or more gestures.

11. The electronic device of claim 8, wherein the at least one processing device is further configured to:

perform automatic speech recognition to generate one or more first texts based on words spoken by at least one of the one or more people;

perform cross-attention using the facial features and the pose features to generate one or more second texts identifying words spoken by at least one of the one or more people; and match at least one of the one or more first texts and at least one of the one or more second texts, the at least one of the one or more people identified based on the matched first and second texts.

12. The electronic device of claim 8, wherein:

the set of features for each person further comprises spoofing features resulting from semantic segmentation of the image frames; and the trained spatiotemporal transformer machine learning model is configured to generate the spoofing features to identify valid pixels in the image frames, spoofed pixels in the image frames, and background in the image frames.

13. The electronic device of claim 8, wherein the at least one processing device is further configured to:

perform pose tracking for each of the one or more people using three-dimensional (3D) skeletal estimation for the person, wherein the pose features of each person are based on the pose tracking; and track at least one of the one or more people across different views or scenes.

14. The electronic device of claim 8, wherein the at least one processing device is configured to simultaneously identify two or more people at a distance of at least five meters.

15. A non-transitory machine readable medium containing instructions that when executed cause at least one processor of an electronic device to:

obtain image frames capturing one or more people in at least one scene;

identify features of the image frames;

provide the identified features to a trained spatiotemporal transformer machine learning model, the trained spatiotemporal transformer machine learning model configured to generate a set of features for each of the one or more people, the set of features for each person comprising facial features of the person and pose features of the person over time;

perform face identification using the facial features in each set of features to generate one or more first embeddings representing at least one face of at least one of the one or more people;

perform gait identification using the pose features in each set of features to generate one or more second embeddings representing at least one gait of at least one of the one or more people; and identify at least one of the one or more people based on the first and second embeddings.

16. The non-transitory machine readable medium of claim 15, further containing instructions that when executed cause the at least one processor to perform one or more actions requested by the at least one identified person, the one or more actions based on input from the at least one identified person.

17. The non-transitory machine readable medium of claim 16, further containing instructions that when executed cause the at least one processor to use landmarks associated with the at least one identified person's hands included in the pose features of the at least one identified person to identify one or more gestures made by the at least one identified person;

wherein the input from the at least one identified person comprises the one or more gestures.

18. The non-transitory machine readable medium of claim 15, further containing instructions that when executed cause the at least one processor to:

perform automatic speech recognition to generate one or more first texts based on words spoken by at least one of the one or more people;

perform cross-attention using the facial features and the pose features to generate one or more second texts identifying words spoken by at least one of the one or more people; and match at least one of the one or more first texts and at least one of the one or more second texts, the at least one of the one or more people identified based on the matched first and second texts.

19. The non-transitory machine readable medium of claim 15, wherein:

the set of features for each person further comprises spoofing features resulting from semantic segmentation of the image frames; and the trained spatiotemporal transformer machine learning model is configured to generate the spoofing features to identify valid pixels in the image frames, spoofed pixels in the image frames, and background in the image frames.

20. The non-transitory machine readable medium of claim 15, further containing instructions that when executed cause the at least one processor to:

perform pose tracking for each of the one or more people using three-dimensional (3D) skeletal estimation for the person, wherein the pose features of each person are based on the pose tracking; and track at least one of the one or more people across different views or scenes.

* * * * *